Sept. 19, 1972  TOMOKAZU GODAI ET AL  3,692,590
FLUX FOR SUBMERGED ARC WELDING
Filed Sept. 2, 1970
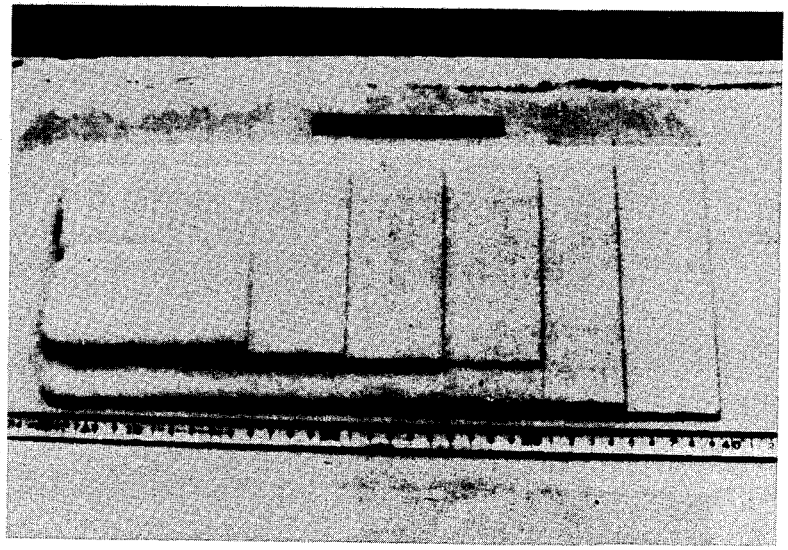
INVENTORS
TOMOKAZU GODAI
OSAMU TANAKA
BY *Oblon, Fisher & Spivak*
ATTORNEYS

United States Patent Office 3,692,590
Patented Sept. 19, 1972

3,692,590
FLUX FOR SUBMERGED ARC WELDING
Tomokazu Godai and Osamu Tanaka, Kamakura, Japan, assignors to Kobe Steel, Ltd., Kobe, Japan
Filed Sept. 2, 1970, Ser. No. 68,966
Claims priority, application Japan, Sept. 3, 1969, 44/69,843
Int. Cl. B23k 35/24
U.S. Cl. 148—23      11 Claims

ABSTRACT OF THE DISCLOSURE

A flux for submerged arc welding comprising 5–17% potash glass, 5–18% magnesia, 5–15% calcium carbonate, 10–20% alumina, 20–33% rutile, and 5–18% of at least one fluoride compound, optionally with less than 7% manganese dioxide added thereto.

BACKGROUND OF THE INVENTION

Field of the invention

This invention relates to a flux to be used in submerged arc welding. More particularly, this invention relates to a flux for use in submerged arc built-up welding, using band form electrodes consisting primarily of nickel-chromium-iron alloy, which exhibits excellent workability and anti-cracking properties.

Description of the prior art

Submerged arc welding with a nickel-chromium-iron alloy is well known in the art, as are the various problems involved in such a process. Among these, the most important problem is the occurrence of hot bead crack immediately after solidification of the molten metal. As preventive measures, it has been suggested to reduce the contents in the weld metal of silicon, phosphorus, sulfur, and similar materials which cause hot bead crack, or to add to the weld metal suitable amounts of niobium, titantium, manganese, etc. However, using ordinary electrodes, it is difficult to reduce the contents of the silicon, phosphorus, or sulfur in the deposit metal, and if niobium, titantium, manganese, etc., are added to the deposit metal from the electrode or flux, slag removability is impaired, leading to a seizure.

SUMMARY OF THE INVENTION

The general purpose of this invention is to provide a flux for submerged arc welding having all of the advantages of prior art methods with none of the above described disadvantages.

Accordingly, it is an object of this invention to provide a flux for submerged arc welding which is capable of reducing the contents of Si, P, and S in the deposit metal.

Another object of this invention is to provide a flux for submerged arc welding which preserves excellent slag removability similar to natural slag removability even when Nb, Ti, Mn, etc., are added to the electrode or flux.

A further object of this invention is to provide a flux for submerged arc welding which fully satisfies the requirements for wide bead formation and beautiful surfacing when a band electrode is used in build-up welding.

Yet another object of this invention is to provide a flux for band electrode submerged arc welding which produces a weld zone with shallow penetration and a beautifully finished smooth surface.

The foregoing and other objects are obtained in accordance with the present invention by a flux for submerged arc welding comprising 5–17% potash glass, 5–18% magnesia, 5–15% calcium carbonate, 10–20% alumina, 20–33% rutile, and 5–18% of at least one fluoride.

BRIEF DESCRIPTION OF THE DRAWING

These and other objects, features, and advantages of the invention will become more fully apparent to those skilled in the art from the following description of illustrative embodiments of the invention, as illustrated in the annexed drawing, which shows the result of testing for hot cracking in weld zones obtained in accordance with the examples presented herein.

DESCRIPTION OF ILLUSTRATIVE EMBODIMENTS

The flux of the present invention is essentially a flux of a high basicity which is almost free of silicate oxides, and which is characterized by its composition comprising 5–17% potash glass, 5–18% magnesia, 5–15% calcium carbonate, 10–20% alumina, 20–33% rutile, and 5–18% of a fluoride compound such as sodium fluoride, fluorite, cryolite, barium fluoride, etc. Required suitable amounts of Nb, Ti, Mn, Al, Ni, Mo, Cr and the like alloy elements are added to insure compatability between the flux and the welding material. Likewise, up to 7% manganese dioxide may be added to prevent zigzagged bead formation.

Potash glass is used in the flux of the present invention to prevent the bead surface from forming pock marks and similar flaws. Amounts of 5–17% by weight are suitable, but the addition of over 17% by weight leads to the formation of zigzag beads, and is therefore undesirable. A preferred potash glass content is from about 8% to about 15%.

The addition of 5% or more magnesium stabilizes the arc and produces a wide bead, while a content of greater than 18% magnesia impairs slag removability. A preferred magnesia content is from about 10% to about 16%.

The addition of calcium carbonate increases the basicity of the slag and assimilation at the bead end, as well as preventing undercut. This is achieved by adding 5–15% by weight calcium carbonate, as an excessive amount of calcium carbonate causes defects such as pockmarks on the bead surface. A preferred composition contains from about 7% to about 12% calcium carbonate.

Alumina is added in order to smooth the bead surface and prevent spattering. An alumina content of less than 10% is hardly effective, while addition of more than 20% by weight of alumina deteriorates the fluidity of the slag and causes undercut of base metal at the bead end, which is undesirable. Preferred amounts of alumina range from about 12% to about 18%.

Rutile is used in order to improve movability of the slag and form a bright bead. At amounts of less than 20%, slag removability is markedly lowered, while amounts greater than 33% are undesirable due to the resultant unstable arc and rough bead surface. Preferred amounts of rutile are from about 21% to about 29%.

In order to prevent undercut and to achieve a shallow weld penetration in build-up welding, from 5% to 18% of at least one species of fluoride are added. Suitable fluorides include sodium fluoride, fluorite, cryolite, and barium fluoride. A fluoride content of greater than 18% is undesirable due to the production of a narrower, convex bead. Preferably, from about 7% to about 13% fluorides are used.

While mixtures in the above proportions attain the objects of the invention, the further addition of not more than 7% manganese dioxide will also prevent the formation of zigzagged beads. Excessive amounts of manganese dioxide are undesirable due to lowered slag removability and seizure. A preferred composition contains from 3% to about 5% manganese dioxide to achieve these results.

In ordinary build-up welding, alloy elements are introduced into the deposit metal through the use of consumable electrodes, flux, etc., in order to prevent hot cracking and improve the mechanical performance of the weld zone. In the same manner, in accordance with the present invention, suitable amounts of Nb, Ti, Mn, Ni, Al, Mo, Cr, and similar alloy metals may be added to the flux to effectively match the contents of those alloy components in the electrodes.

EXAMPLE 1

This example illustrates the use of flux of the present invention in the submerged arc welding of 9% nickel steel. The flux materials were added in powder form to water glass, and the mixture was then sintered at 450° C. and pelletized prior to use. 9% nickel steel plates, 19 mm. thick, single V groove, butt-joined were welded for four passes by three-o'clock welding, starting at the face side at 280–300 a. (DC, RP) at 30–32 v. at 30–40 cm./min. After gouging, the back side was given 3 passes of welding under the same conditions. As a result of the welding done under the above conditions, a beautiful weld zone having excellent slag movability was obtained which was free from hot cracking. The composition of the flux, wire, and base metal (9% nickel steel, 19 mm. thick, 150 mm. wide, 500 mm. long) are shown in Table 1, and the chemical composition of the weld metal is shown in Table 2. Charpy impact values in the weld zone are shown in Table 3.

Table 1—Composition of flux, wire (2.0 mm. φ) and base metal used in Example 1

| Flux: | Percent |
|---|---|
| Potash glass | 15 |
| Magnesia | 12 |
| Calcium carbonate | 7 |
| Alumina | 12 |
| Rutile | 22 |
| Fluorite | 5 |
| Cryolite | 2 |
| Nickel | 3 |
| Manganese | 14 |
| Ferro-aluminum | 4 |
| Ferro-niobium | 3 |
| Chromium | 1 |
| Wire: | |
| C | 0.025 |
| Si | 0.23 |
| Mn | 3.15 |
| Cr | 19.57 |
| Fe | 1.54 |
| Nb+Ta | 2.63 |
| Ti | 0.48 |
| P | 0.003 |
| S | 0.002 |
| Ni | Balance |
| Base metal: | |
| C | 0.06 |
| Mn | 0.55 |
| Si | 0.22 |
| P | 0.006 |
| S | 0.014 |
| Ni | 8.97 |
| Fe | Balance |

Table 2.—Chemical composition of weld metal obtained in Example 1 (Percent)

| C | 0.057 |
|---|---|
| Si | 0.34 |
| Mn | 5.87 |
| P | 0.005 |
| S | 0.008 |
| Cr | 15.32 |
| Al | 0.04 |
| Ti | 0.18 |
| Nb+Ta | 2.23 |
| Fe | 14.18 |
| Ni | Balance |

Table 3.—Charpy impact value in weld zone obtained in Example 1 (kg./m., 2 mm. V-notch—196° C.)

| Base metal | 15.3 |
|---|---|
| Heat-affected part of base metal | 10.5 |
| Weld metal | 10.2 |

Example 2

This example shows the use of the flux of the present invention in build-up welding using a nickel-chromium-iron alloy band electrode. As before, the flux mixture was formed and added in powder form to water glass, which was then sintered at 450° C. and pelletized. The band electrode used was 0.4 mm. thick at 50 mm. wide, and the base metal ASTME 535 Gr B (150 t. x 350 w. x 500 l.). Welding conditions were 750–800 A. (DC, reverse polarity—a welding process in which the electrode is connected to a plus source and the workpiece is connected to a minus source) at 27–28 v. at 18–20 cm./min. As a result of submerged arc build-up welding with the band electrode under these conditions, an extremely beautiful built-up zone was obtained. The attached drawing illustrates the results of tests for hot cracking, in which no cracking was observed. In the side bending test (ASME Standard, Sec. IX, bend at 180°) no fault was found in the weld. The composition of the flux, band electrode and base metal are shown in Table 4, while Table 5 shows the composition of the weld metal, and Table 6 shows the results of tension testing of the build-up weld metal.

Table 4.—Composition of flux, band electrode and base metal used in Example 2

| Flux: | Percent |
|---|---|
| Potash glass | 13 |
| Magnesia | 16 |
| Calcium carbonate | 12 |
| Alumina | 18 |
| Rutile | 21 |
| Fluorite | 7 |
| Sodium fluoride | 6 |
| Managanese dioxide | 3 |
| Nickel | 4 |
| Band electrode: | |
| C | 0.02 |
| Si | 0.20 |
| Mn | 3.15 |
| Cr | 19.85 |
| Fe | 1.45 |
| Nb+Ta | 2.78 |
| Ti | 0.63 |
| P | 0.002 |
| S | 0.004 |
| Ni | Balance |
| Base metal: | |
| C | 0.19 |
| Si | 0.33 |
| Mn | 1.26 |
| Ni | 0.63 |
| Mo | 0.52 |
| P | 0.009 |
| S | 0.004 |
| Fe | Balance |

TABLE 5.—CHEMICAL COMPOSITION OF WELD METAL OBTAINED IN EXAMPLE 2
(PERCENT)

| Built-up layer | C | Si | Mn | Cr | Fe | Nb+Ta | Ti | P | S | Ni |
|---|---|---|---|---|---|---|---|---|---|---|
| 1st layer | 0.048 | 0.45 | 2.62 | 17.21 | 12.92 | 1.86 | 0.16 | 0.002 | 0.004 | Balance. |
| 2nd layer | 0.037 | 0.49 | 2.91 | 18.92 | 4.15 | 2.11 | 0.18 | 0.002 | 0.003 | Do. |

TABLE 6.—RESULTS OF TENSION TEST OF WELD METAL OBTAINED IN EXAMPLE 2

| Post-heating treatment | Tensile strength (kg./mm.$^2$) | Elongation, (percent) | Reduction of area, (percent) |
|---|---|---|---|
| As welded | 62.1 | 53 | 55 |
| 620° C. for 6 hr. SR | 61.9 | 52 | 57 |

SR refers to stress relief. Stress is generated during the welding and must be relieved after welding, which is usually accomplished by annealing at 620° C. for six hours.

EXAMPLE 3

This example illustrates build-up welding using band electrodes of nickel-chromium-iron alloys. As in the previous examples, the flux mixture in powder form was added to water glass, sintered at 450° C., and pelletized. The band electrode was 0.4 mm. thick x 50 mm. wide, the base metal was SB42B (50 T x 300 W x 600 mm. L.), and the welding conditions were 800 a. (DC, RP) at 27 v. at 19 cm./min. Build-up welding using the band electrode under the above conditions produced, as in Example 2, a beautiful built-up zone which was free from hot cracking. The composition of the flux, band electrode and base metal is shown in Table 7.

Table 7.—Composition of flux, band electrode and base metal used in Example 3

Flux: Percent
- Potash glass _____ 8
- Magnesia _____ 10
- Calcium carbonate _____ 7
- Alumina _____ 13
- Rutile _____ 29
- Fluorite _____ 4
- Barium fluoride _____ 3
- Cryolite _____ 4
- Manganese dioxide _____ 5
- Ferro-niobium (50% Nb) _____ 1
- Ferro-titanium (45% Ti) _____ 10
- Manganese _____ 6

Band electrode: Percent
- C _____ 0.018
- Si _____ 0.15
- Mn _____ 1.14
- Cr _____ 19.78
- Fe _____ 1.83
- Nb+Ta _____ 2.96
- P _____ 0.003
- S _____ 0.005
- Ni _____ Balance Base metal: Percent
- C _____ 0.16
- Si _____ 0.13
- Mn _____ 0.98
- P _____ 0.014
- S _____ 0.010
- Fe _____ Balance It will be appreciated that other modifications of the flux illustrated in the examples may readily be made for various purposes. Thus, while the foregoing disclosure relates only to illustrative embodiments of the invention in submerged arc welding, it is capable of use for various other purposes, and will provide a suitable flux under different conditions. Accordingly, numerous modifications or alterations may be made by those skilled in the art without departing from the spirit and scope of the invention as set forth in the appended claims.

What is claimed is:

1. A flux for submerged arc welding comprising by weight 5–17% potash glass, 5–18% magnesia, 5–15% calcium carbonate, 10–20% alumina, 20–33% rutile, and 5–18% of at least one fluoride compound.

2. The flux of claim 1 in which said fluoride compound is selected from the group consisting of sodium fluoride, fluorite, cryolite, and barium fluoride.

3. The flux of claim 2 further comprising from about 1% to about 7% manganese dioxide.

4. The flux of claim 1 further comprising from about 1% to about 7% manganese dioxide.

5. The flux of claim 1 comprising 8–15% potash glass, 10–16% magnesia, 7–12% calcium carbonate, 12–18% alumina, and 21–29% rutile, and 7–13% fluoride.

6. The flux of claim 5 further comprising from 3% to 5% manganese dioxide.

7. The flux of claim 5 in which said fluoride is selected from the group consisting of sodium fluoride, fluorite, cryolite, and barium fluoride.

8. The flux of claim 7 further comprising 3–5% manganese dioxide.

9. The flux of claim 1 containing 15% potash glass, 12% magnesia, 7% calcium carbonate, 12% alumina, 22% rutile, 5% fluorite, and 2% cryolite, with the balance of the flux material comprising metals or metal alloys selected from the group consisting of Nb, Ti, Mn, Al, Ni, Mo, Cr and alloys thereof.

10. The flux of claim 1 containing 13% potash glass, 16% magnesia, 12% calcium carbonate, 18% alumina, 21% rutile, 7% fluorite, 6% sodium fluoride, and 3% manganese dioxide, the balance thereof being a metal.

11. The flux of claim 1 containing 8% potash glass, 10% magnesia, 7% calcium carbonate, 13% alumina, 29% rutile, 4% fluorite, 3% barium fluoride, 4% cryolite, and 5% manganese dioxide, the balance thereof being metal or metal alloys.

References Cited

UNITED STATES PATENTS

| 3,023,133 | 2/1962 | Lewis et al. | 148—26 |
| 2,720,473 | 10/1955 | Donahey | 148—26 |
| 3,320,100 | 5/1967 | Coless | 148—26 |
| 2,576,123 | 11/1951 | Kihlgren et al. | 148—24 X |
| 3,208,886 | 9/1965 | Reilley et al. | 148—26 |

GEORGE T. OZAKI, Primary Examiner

U.S. Cl. X.R.

148—24, 26; 219—73